United States Patent [19]
Howell

[11] 4,085,360
[45] Apr. 18, 1978

[54] METHOD AND APPARATUS FOR DETERMINING THE PRESENCE OF OR ABSENCE OF AN UNDERGROUND BODY

[75] Inventor: Mark Ian Howell, 108 Sylvan Way, Sea Mills, England

[21] Appl. No.: 695,568

[22] Filed: Jun. 14, 1976

[51] Int. Cl.² .................. G01V 3/10; G01R 33/02
[52] U.S. Cl. ................................. 324/3; 324/67
[58] Field of Search ...................... 324/3, 6-8, 324/67

[56] References Cited

U.S. PATENT DOCUMENTS

| 1,820,953 | 9/1931 | Sundberg et al. | 324/6 |
| 2,358,027 | 12/1944 | Penther et al. | 324/67 |
| 3,321,700 | 5/1967 | Zimmerman | 324/8 |
| 3,388,323 | 6/1968 | Stripling | 324/8 |
| 3,391,334 | 7/1968 | Ruehle | 324/8 |
| 3,617,865 | 11/1971 | Hakata | 324/67 X |
| 3,889,179 | 6/1975 | Cutler | 324/3 |
| 3,907,136 | 9/1975 | Christides et al. | 324/67 X |
| 3,930,324 | 1/1976 | Wightman et al. | 324/3 X |
| 4,010,413 | 3/1977 | Daniel | 324/6 |

FOREIGN PATENT DOCUMENTS

| 654,474 | 12/1962 | Canada | 324/6 |
| 1,064,164 | 8/1959 | Germany | 324/67 |
| 1,623,104 | 6/1970 | Germany | 324/3 |

*Primary Examiner*—Gerard R. Strecker
*Attorney, Agent, or Firm*—Young & Thompson

[57] ABSTRACT

An instrument for detecting the presence or absence of a buried pipe or cable employs three or more generally vertical coil aerials which define a triangular or polygonal area on the ground. The natural or induced electromagnetic radiation from any underground pipe or cable cutting that area gives rise to phase differences at the aerials which can be discriminated. The aerial array may be adjustable, and the discrimination may be direct or involve mixing the received signals. Facility for listening to various frequencies, perhaps simultaneously, can be provided.

13 Claims, 7 Drawing Figures

METHOD AND APPARATUS FOR DETERMINING THE PRESENCE OF OR ABSENCE OF AN UNDERGROUND BODY

This invention relates to the location of underground pipes and cables.

Existing means of pipe and cable location usually require that a detector be moved about a survey site in order that the amplitude of energy radiating from the subsurface conductors be compared at *different* positions. The pipe plan position is conventionally ascertained by plotting zero, or maximum, energy positions.

There is frequently, however, a need to determine simply that a particular position is not underlain by a pipe or cable, and consequently a need for a technique whereby this can be simply ascertained without the necessity for investigating adjacent positions, and without requiring the operator to possess any special skills. Such a technique would be useful, for example, where a hole is to be dug by a road to receive a telegraph pole.

It is an object of this invention to provide an apparatus and method for surveying a site quickly and accurately to determine whether a pipe or cable is buried beneath it.

According to the present invention there is provided an instrument for determining the presence or absence of a buried cable or pipe, comprising an array of aerial coils whose extended axes define the corners of a multi-sided area on the ground and a receiver for comparing the phases of signals produced in the coils and indicating whether such signals are in or out of phase.

Under normal circumstances a pipe or cable buried below the ground will carry some form of AC energy which can be detected. With the device of this invention situated above a site whose shape is determined by the multi-sided area defined on the ground below the instrument, if a pipe or cable is buried below that area the AC energy radiated by the pipe or cable will cause a phase difference between the signals registered in the coils.

In a preferred form there are three coils defining a triangular area since this utilises the minimum of equipment and reduces the possibility of errors occuring due to a pipe being positioned so that it bisects say a square area defined by four coils. The coils may be rigidly set with mutually parallel axes, but in a preferred arrangement the coils are pivotally mounted so that they may be splayed outwardly relative to each other, in the downward direction. With such a pivotal arrangement the range of operation of the device (i.e. area covered) can be increased or decreased at will.

It is preferred that the receiver should incorporate a Yes/No meter to indicate phase equality or inequality respectively.

Various means may be provided for comparing the phases of the signals produced in the coils. In one arrangement, the receiver incorporates a phase discriminator for comparing the outputs from all the coils. In another, the receiver is adapted to use one coil output as a reference signal and to make phase comparisons between this reference signal and the other coil signals. In a further embodiment, the receiver is adapted to combine the outputs of a plurality of coils and compare the combined output with the output from one of the coils in a phase detector. In this case it is preferred that the coil outputs are first connected through respective hi-pass/lo-pass amplifiers.

A fourth possibility is to design a receiver so that it will monitor the signals from the coil at differing frequencies. This will take account of the possibility that the AC energy radiated by a pipe or cable may be other than, for instance, conventional mains frequency of 50 Hz. The receiver can be designed to monitor the signals from the coils at two different frequencies simultaneously.

In each case, the coil signals may be integrated to increase sensitivity.

The invention also extends to a method of determining the presence or absence of a buried cable or pipe utilising an instrument in accordance with the invention as hereinbefore defined, wherein the instrument is located over the site to be surveyed and the phases of signals produced in the coils are compared to provide a signal indicating phase equality or inequality.

If a larger area is required to be surveyed than, say, the triangle defined by three coils the instrument can be moved over the ground to cover the necessary larger area. One convenient method would be to rotate the instrument about an axis passing through one of the coils which would result in monitoring of a circular area whose radius equals the distance between two of the coils.

To allow for the possibility that a buried pipe or cable may not in fact carry any AC energy an induction generator can be moved around the instrument in order to excite the buried pipe or cable and induce AC energy thereinto.

The invention may be performed in various ways and some embodiments will now be described, by way of example, with reference to the accompanying drawings, in which.

Figure 1:
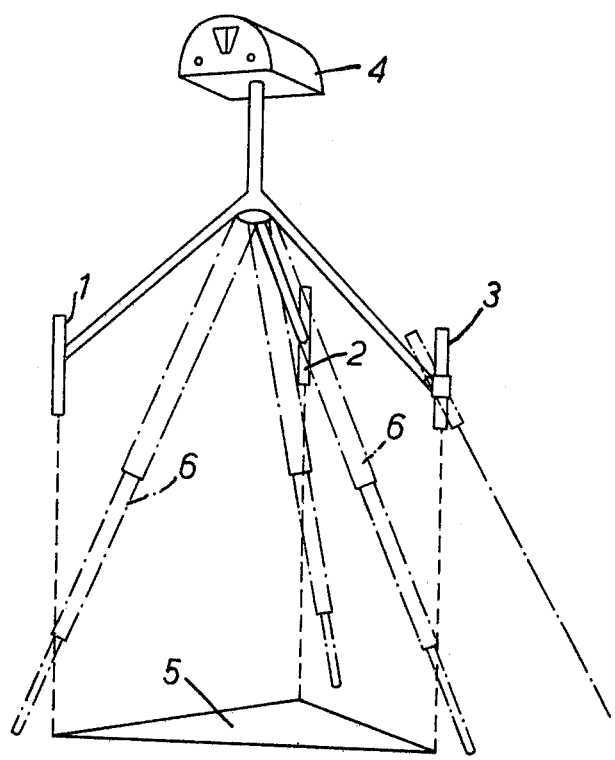
FIG. 1 is a schematic view of an instrument according to the invention.

The instrument shown in FIG. 1 comprises a Yes/No meter 4 coupled to an array of coil aerials 1, 2, 3. These three coils are arranged vertically at the corners of an imaginary triangle 5, and it can be shown that their individual outputs will be proportional to 1/D Sin $\theta$, where D is the distance to an underground electromagnetic wave radiation source, and $\theta$ is the angle subtended between the cil axis and the line between the mid-point of the coil and the nearest part of the radiating source.

In order to make this instrument more compact, the coils 1, 2, 3 could be more closely spaced and inclined from the vertical to splay outwardly and cover at and below ground level a larger triangular site than the triangle formed by the coils themselves. Indeed, the coils could be pivotally mounted, as indicated by coil 3, so that the size of the zone of phase sensitivity could be varied as desired. The instrument could also be mounted on telescopic legs 6, shown in outline, to provide height adjustment.

The outputs of aerials 1, 2 and 3 will be in phase if any source of radiating energy does not lie within the triangle 5, viewed in plan. But if any source does lie within that triangle, there will be a phase difference between the two aerials whose projected axes straddle the radiating source.

Figure 2:
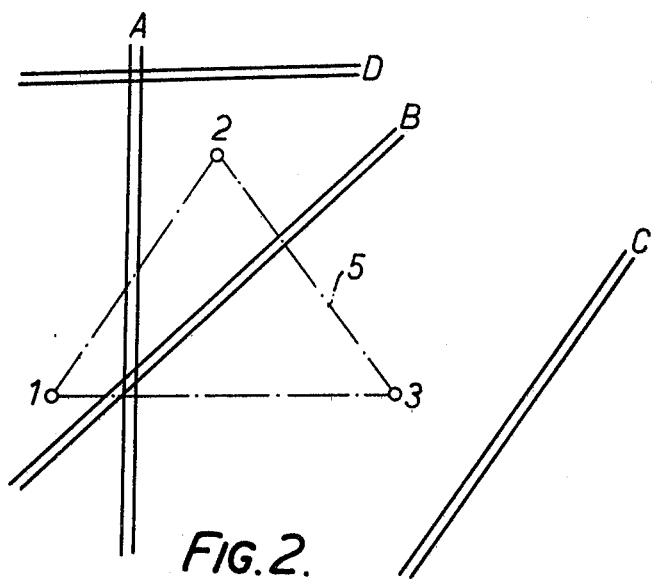
FIG. 2 illustrates the use of the instrument of FIG. 1 to detect pipes in various positions.

Referring to FIG. 2, if the instrument of FIG. 1 is situated over a possible site for excavation with the aerials 1, 2, 3 disposed as shown, and a pipe or cable is radiating in position A, aerials 2 and 3 will be mutually in phase but aerial 1 will be out of phase with them. If a pipe or cable is radiating in position B, aerials 1 and 2 will be in phase and aerial 3 in antiphase. In either case a "no-go" situation will be revealed. However, if a pipe or cable is radiating in either of positions C and D all three aerials 1, 2, 3 will be in phase and a "go" situation will be indicated by the Yes/No meter 4.

The nature of the signal radiated by the buried conductor can be of various forms, and it is anticipated that the receiver array described may be operated in any or all of the following modes of "listening":

Virtually all long underground conductors carry some sort of AC energy whether or not they are intentionally energised. For example most water pipes and gas pipes carry 50 Hz AC resulting from stray mains return currents. There is also likely to be energisation of conductors by induction from power and radio-frequency sources, so it may be practicable to dispense with any specially introduced radiating energy. Such a receiver might detect 80 to 90% of all metal services, possibly more.

As a precaution, however, an induction generator can be moved in a circle around the receiver at a suitable distance in order to excite the odd metallic service which may not be carrying any AC whatever. The frequency of this generator might be within the band 500 Hz to 100 KHz or even up to 10 MHz, and it could be adapted to radiate energy at one or more frequencies simultaneously. The currents induced in services by this energy could be phase discriminated as described below. Direct radiation which might be picked up from the moving generator source would be in phase in all the aerials and so would not create a false response.

It may be necessary to cause the receiver instrument to listen consecutively or simultaneously to different frequency bands. One reason is that very high energy levels are experienced in the vicinity of power cables at 50Hz, and the possibility exists that the energy radiated by other services at this and other frequencies may be lower in magnitude by a factor of up to 1000, and thus be obscured. Accordingly it may be desirable to listen consecutively or simultaneously:

a. To the power frequency 50 or 60 Hz.
b. To a wider band of frequencies, cutting off sharply below, say 1000 Hz and extending possibly to 10 MHz. With consecutive listening, switching between these modes may be manual or automatic.

Figs. 3A–3D show in diagrammatic form four examples of such circuits.

Figure 3A:
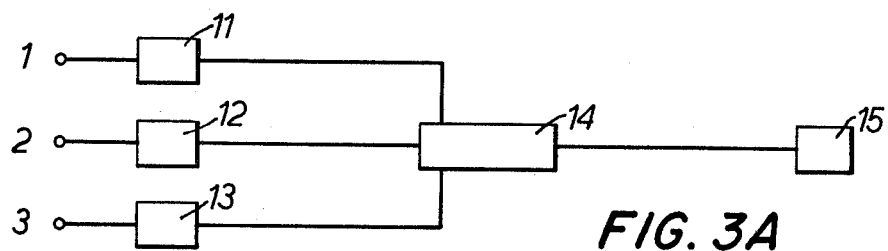
FIGS. 3A, 3B, 3C and 3D show simplified block diagrams of circuits for processing the output of the instrument shown in FIG. 1.

In FIG. 3A the outputs of the three aerials 1, 2, 3 are applied to respective amplifiers 11, 12, 13 and thence to a phase discriminator 14 which governs a gate 15. Comparison of the aerial outputs is made over a pre-determined period, and if they are essentially similar in phase the discriminator causes the gate to switch to the sense in which the instalment indicates 'go', i.e. it is safe to excavate. If there is any phase dissimilarity the gate does not operate, and a 'no-go' situation is revealed.

Figure 3B:
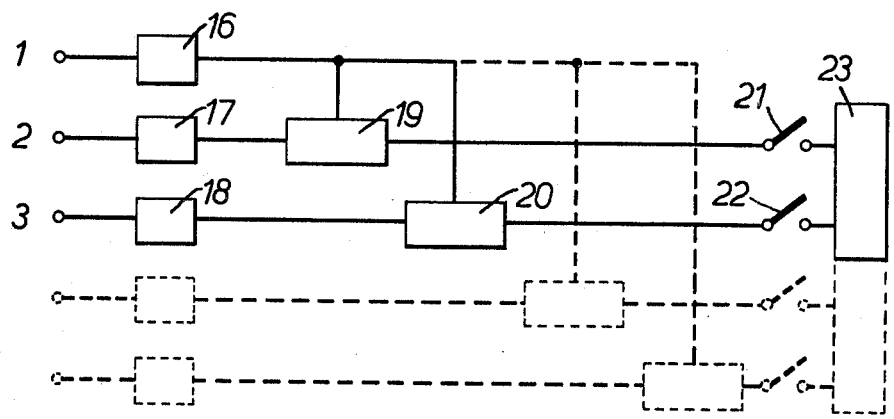

FIG. 3B shows an alternative arrangement, where the signals for aerials 1, 2, 3 are fed to associated amplifier/limiter circuits 16, 17, 18, and the signal from aerial 1 is taken as a reference and compared separately with the signals from aerials 2 and 3 in phase comparators 19 and 20 respectively. Either of these sensing a phase discrepancy will close an associated switch 21 or 22 to activate the go/no-go display 23.

Figure 3C:
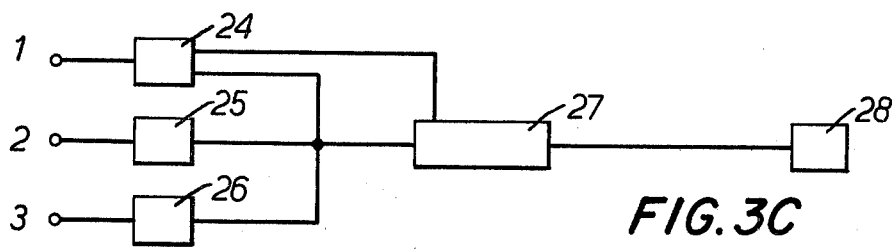

In FIG. 3C the outputs of the aerials 1, 2, 3 are respectively applied to hi-pass/lo-pass amplifiers 24, 25, 26 and the outputs of these are combined and applied to one input of a phase detector 27. The other input of the detector receives just one aerial signal, from reference aerial 1. The output of the detector governs a gate 28. A phase difference in one of the aerials will cause one of the phase detector inputs to lead or lag the other, and the gate will be operated accordingly.

Figure 3D:
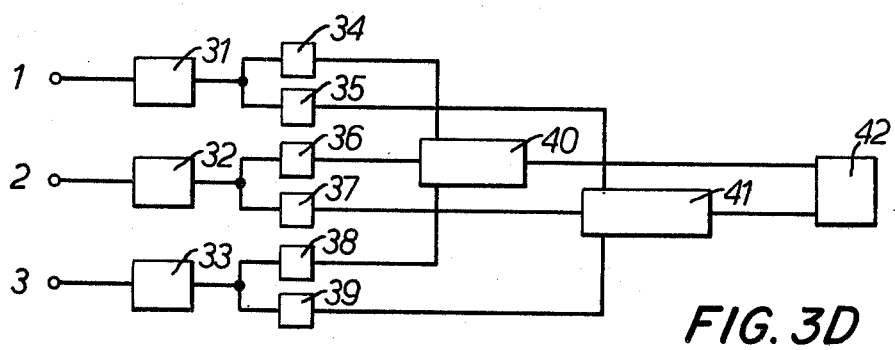

For the case where it is desired to listen to different frequencies, the circuit of FIG. 3D may be adopted. Here, the outputs of the aerials are applied to respective amplifiers 31, 32 and 33 and thence to pairs of filters 34, 35; 36, 37; and 38, 39, the even references indicating 50 Hz and the odd ones hi-pass filters. The mains frequency filters have their outputs fed to an associated phase detector 40, while the hi-pass filters feed a phase detector 41. The detectors 40 and 41 govern a gate 42, and if there is any out-of-phase signal a no-go situation will be indicated.

The coupling to the phase detectors of FIG. 3D is shown in the manner of FIG. 3A, but the arrangements of FIG. 3B or 3C could be followed.

In any of these circuits, the signals could be integrated over a period of time, say one to ten seconds. This would enable considerably smaller signal energies to be detected then is usually the case.

It is possible to have more than three aerials defining a polygonal area. The same principles apply, and any of the circuits can be extended, this being indicated in outline in FIG. 3B.

Figure 4:
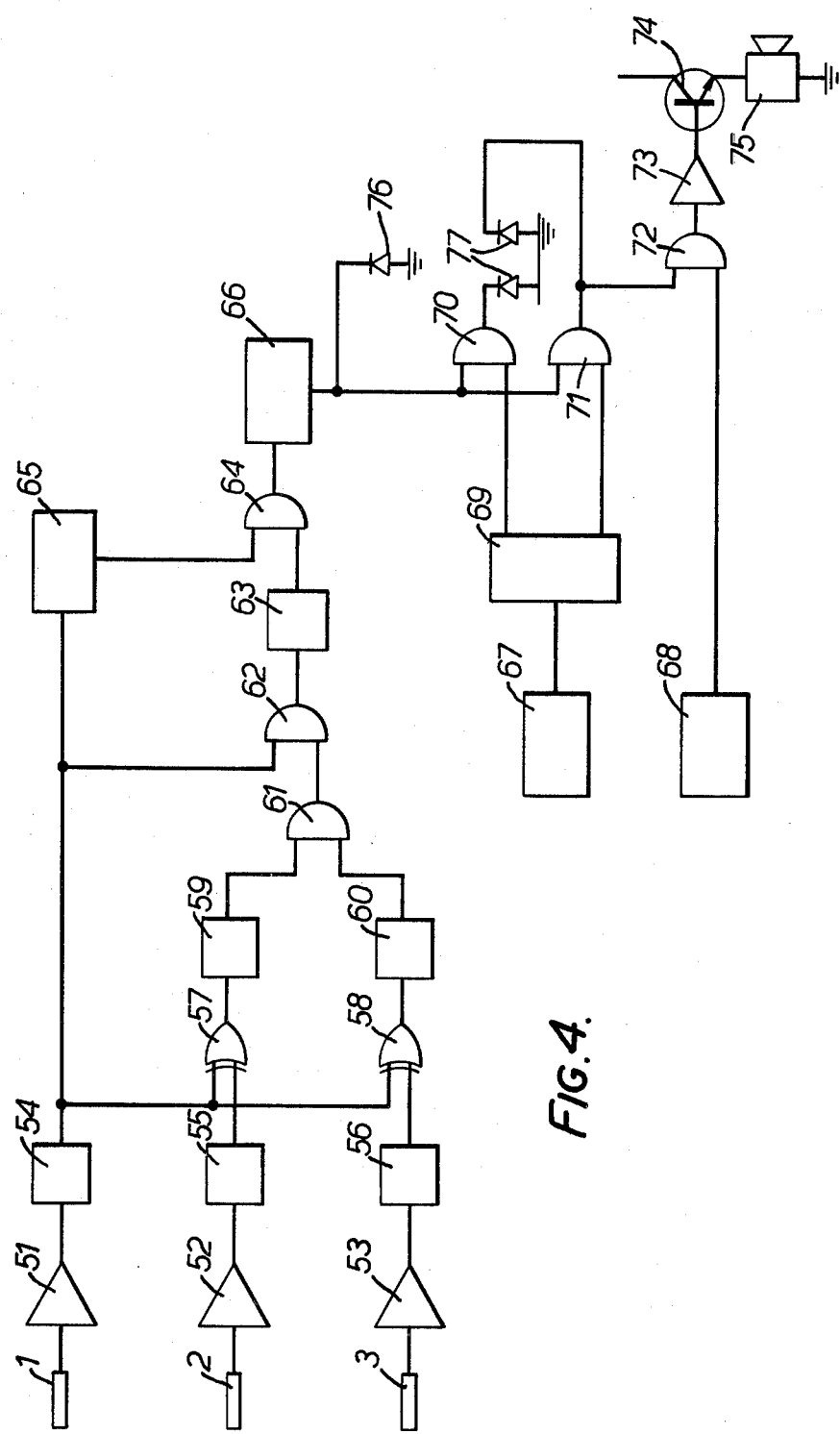
FIG. 4 is a more detailed block diagram of a precessing circuit.

Referring to FIG. 4, a more detailed circuit will now be described. Here the aerials 1, 2 and 3 have their outputs respectively fed to amplifiers 51, 52 and 53, and thence to analogue to digital converters 54, 55 and 56. The signal from aerial 1 is taken as a reference signal and phase comparisons are made between this signal and the two others by means of exclusive-OR gates 57 and 58. The outputs of these gates are directed via inverters 59, 60 to AND gate 61 and thence to a further AND gate 62 whose other input receives the reference signal. This further AND stage is provided since exclusive OR gates tend to double the frequency of the signals being compared.

The combined output of gate 62 is applied through inverter 63 to a further AND gate 64. The reference signal is also applied to a re-triggerable monostable multivibrator 65 which produces a negative pulse of 100 nS, which is applied to the other input of gate 64. This is to suppress any switching spikes which may have been generated in the phase comparators and to prevent the unit from being ultra sensitive. The output of gate 64 is used to trigger another re-triggerable monostable multivibrator 66, which produces a pulse of 250mS.

There are two free running oscillators 67 and 68, oscillator 67 having a period of 250mS and oscillator 68 an audio frequency of about 8kHz. The oscillator 67 triggers a multivibrator 69 whose period will be 500mS. The outputs of circuit 69 are applied to respective AND gates 70 and 71, whose other inputs receive the 250mS pulse from the circuit 66. The output of gate 71 is applied to AND gate 72 whose other input receives the output of oscillator 68. The output of this gate is amplified in circuit 73 and applied to transistor 74 which acts as a switch controlling loudspeaker 75.

The output of circuit 66 is also directed to a green light emitting diode (L.E.D.) 76 which will be 'on' when there are no significant phase differences. The output of AND gates 70 and 71 are directed to red L.E.D.s 77 which are energized when there is a phase difference, indicating a no-go situation. They will flash in the 'one on - one off' mode.

When there is a phase difference between on aerial and the other two, this condition will cause a change of logic level at the outputs of the exclusive-OR gates 57 and 58 proportional to the amount of phase shift. If this change is less than 100 nS then the state of the read-outs will not change, this amount being equivalent to a phase shift of less than one degree at 20kHz. However, if the change is greater than this, then the monostable multivibrator 66 will change state and cause the green L.E.D. to cease to conduct and also enable the red L.E.D.s 77 and the audible warning tone. As the circuit 66 is re-triggerable during its output pulse, then every trigger pulse will re-set it to 250 mS so that its output will remain constant all the time a phase difference is present. If there is no phase difference, or no signal at all is present, then the circuit 66 will not trigger and the green L.E.D. 76 will be enabled.

The multiple aerial system described may have other than static applications. For example, traversed manually or mechanically it could produce phase anomaly information regarding pipe and cable positions with greater discrimination than conventional systems.

I claim:

1. An instrument for determining the presence or absence of an underground body capable of radiating an electromagnetic field, such as a buried pipe or cable, comprising an array of at least three generally similarly oriented receiver antenna coils, means for mounting such coils so that their extended axes define the corners of a polygonal area on the ground, a receiver including means coupled to said coils for comparing the phases of signals produced in all the coils, and means coupled to said comparing means for giving a warning signal only when any two of the first-mentioned signals are in antiphase thereby to indicate that at least one pair of said extended axes are straddling an underground body.

2. An instrument according to claim 1, wherein there are three coils defining a triangular area.

3. An instrument according to claim 1, wherein the coils have mutually parallel axes.

4. An instrument according to claim 1, wherein the coils are pivotally mounted so that they may be splayed outwardly relative to each other, in the downward direction.

5. An instrument according to claim 1, wherein the receiver includes a phase discriminator for comparing the outputs from all the coils.

6. An instrument according to claim 1 wherein the receiver is adapted to use one coil output as a reference signal, and to make phase comparisons between this reference signal and the other coil signals.

7. An instrument according to claim 1, wherein the receiver is adapted to combine the outputs of a plurality of coils and compare the combined output with the output from one of the coils in a phase detector.

8. An instrument according to claim 7, wherein the coil outputs are first directed through respective hi-pass/lo-pass amplifiers.

9. An instrument according to claim 1 wherein the receiver is adapted to monitor the signals from the coils at differing frequencies.

10. An instrument according to claim 9, wherein the receiver is adapted to monitor the signals from the coils at two different frequencies simultaneously.

11. An instrument as claimed in claim 1, wherein the coil signals are integrated to increase sensitivity.

12. A method of determining the presence or absence of an underground body capable of radiating an electromagnetic field, such as a buried pipe or cable, comprising arranging at least three generally similarly oriented receiver antenna coils so that their extended axes define the corners of a polygonal area on the ground, comparing the phases of signals produced in all the coils, thereby to determine whether any two of said signals are in antiphase, and providing a warning signal only when any two first-mentioned said signals are in antiphase, representative of the presence of a said body directly below said polygonal area.

13. A method as claimed in claim 12, wherein a generator is used in the vicinity of said site to induce AC energy in any buried pipes or cables.

* * * * *